(12) United States Patent
Stevens et al.

(10) Patent No.: US 10,109,902 B2
(45) Date of Patent: *Oct. 23, 2018

(54) METAL-AIR BATTERY HAVING A DEVICE FOR CONTROLLING THE POTENTIAL OF THE NEGATIVE ELECTRODE

(71) Applicant: ELECTRICITE DE FRANCE, Paris (FR)

(72) Inventors: Philippe Stevens, Noisy Rudignon (FR); Gwenaelle Toussaint, Nemours (FR)

(73) Assignee: Electricite de France, Paris (FR)

( * ) Notice: Subject to any disclaimer, the term of this patent is extended or adjusted under 35 U.S.C. 154(b) by 159 days.

This patent is subject to a terminal disclaimer.

(21) Appl. No.: 14/648,307

(22) PCT Filed: Nov. 25, 2013

(86) PCT No.: PCT/FR2013/052845
§ 371 (c)(1),
(2) Date: May 29, 2015

(87) PCT Pub. No.: WO2014/083267
PCT Pub. Date: Jun. 5, 2014

(65) Prior Publication Data
US 2015/0303539 A1    Oct. 22, 2015

(30) Foreign Application Priority Data
Nov. 29, 2012 (FR) .................................. 12 61397

(51) Int. Cl.
*H01M 12/08* (2006.01)
*H01M 10/44* (2006.01)
(Continued)

(52) U.S. Cl.
CPC ............ *H01M 12/08* (2013.01); *H01M 10/44* (2013.01); *H01M 10/48* (2013.01); *H01M 12/02* (2013.01); *Y02E 60/128* (2013.01)

(58) Field of Classification Search
CPC ...... H01M 10/44; H01M 12/02; H01M 12/08; H01M 10/48
(Continued)

(56) References Cited

U.S. PATENT DOCUMENTS 3,532,548 A    10/1970  Stachurski
3,660,170 A *   5/1972  Rampel ................ H01M 4/244
                                                429/216
(Continued)

FOREIGN PATENT DOCUMENTS

JP    48-001750 A      1/1973
SG       195019 A1   12/2013
(Continued)

OTHER PUBLICATIONS

Engliish language machine translation of Toussaint et al. WO 2012/156639 (A1)—Nov. 22, 2012, "Metal-Air Accumulator with Air Electrode Protection Device".*
(Continued)

*Primary Examiner* — Jonathan G Jelsma
*Assistant Examiner* — Omar M Kekia
(74) *Attorney, Agent, or Firm* — Drinker Biddle & Reath LLP

(57) ABSTRACT

A method for storing and releasing power using a metal-air battery, which includes: (a) a discharge phase during which a first positive air electrode is connected to the positive terminal of the battery and a second positive oxygen-release electrode is disconnected from the positive terminal of the battery; (b) a recharging phase during which the second positive oxygen-release electrode is connected to the posi-
(Continued)

tive terminal of the battery and the first positive air electrode is disconnected from the positive terminal of the battery, and during which the potential of the negative electrode is measured relative to the first positive air electrode. Also disclosed is a metal-air battery designed especially for implementing said method.

7 Claims, 1 Drawing Sheet

(51) Int. Cl.
    *H01M 10/48*     (2006.01)
    *H01M 12/02*     (2006.01)

(58) Field of Classification Search
    USPC .......................................... 429/403
    See application file for complete search history.

(56) References Cited

U.S. PATENT DOCUMENTS

| | | |
|---|---|---|
| 5,250,370 A | 10/1993 | Faris |
| 5,306,579 A | 4/1994 | Shepard, Jr. et al. |
| 2011/0070506 A1 | 3/2011 | Friesen et al. |
| 2011/0133699 A1* | 6/2011 | Howard ............ H01M 4/131 320/137 |
| 2012/0021303 A1* | 1/2012 | Amendola ............ H01M 4/42 429/406 |
| 2012/0041628 A1* | 2/2012 | Hermann .......... H01M 8/04089 701/22 |
| 2012/0249080 A1 | 10/2012 | Suto |

FOREIGN PATENT DOCUMENTS

| | | | | |
|---|---|---|---|---|
| WO | WO 00/36677 A1 | 6/2000 | | |
| WO | WO 2012/156639 | * | 11/2012 | ......... H01M 10/425 |
| WO | WO 2012/156639 A1 | 11/2012 | | |

OTHER PUBLICATIONS

Office Action issued in related application JP 2015-544512, dated Jun. 27, 2016, with machine generated English language translation, 9 pages.

Neburchilov et al., "A review on air cathodes for zinc-air fuel cells," Journal of Power Sources, 195 (5), Mar. 1, 2010, pp. 1271-1291.

* cited by examiner

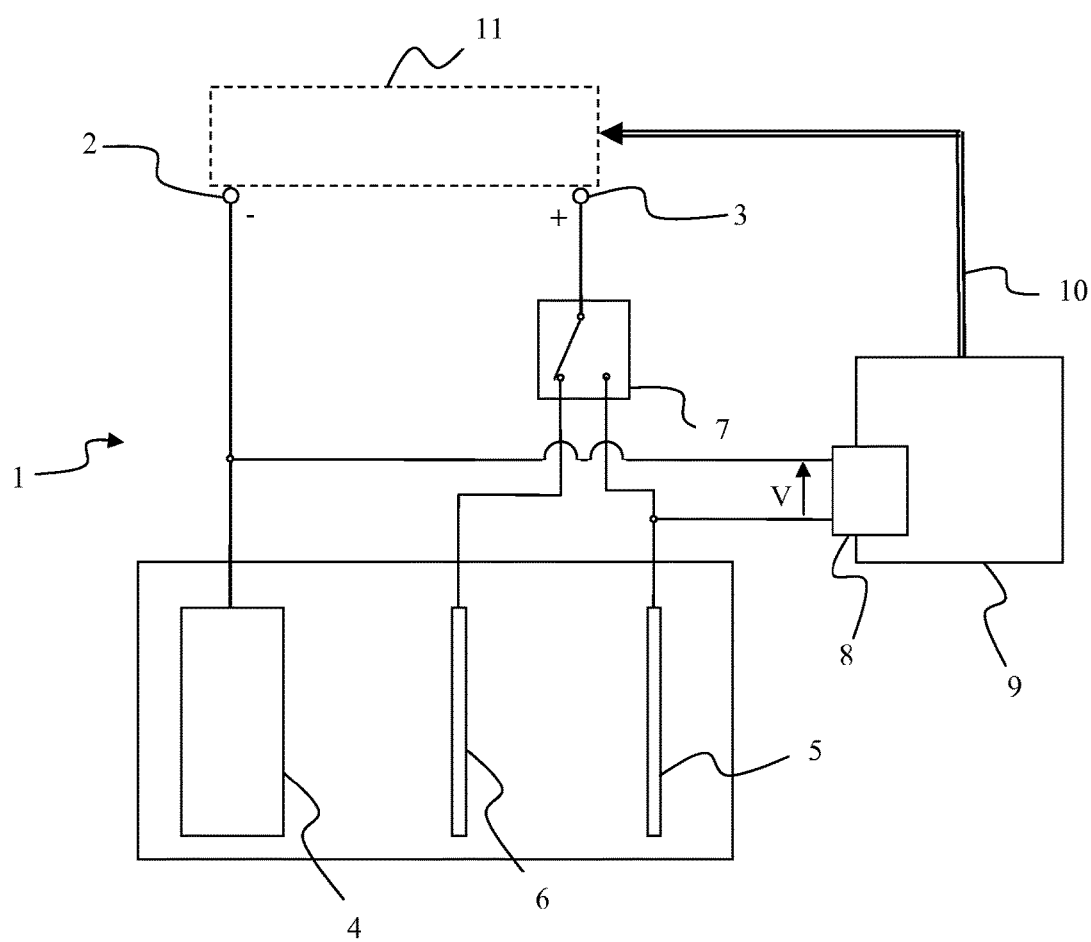

METAL-AIR BATTERY HAVING A DEVICE FOR CONTROLLING THE POTENTIAL OF THE NEGATIVE ELECTRODE

CROSS-REFERENCE TO RELATED APPLICATIONS

This application is the U.S. national phase of the International Patent Application No. PCT/FR2013/052845 filed Nov. 25, 2013, which claims the benefit of French Application No. 12 61397 filed Nov. 29, 2012, the entire content of which is incorporated herein by reference.

FIELD

The present invention relates to a method for storing and releasing electrical energy using a battery of the metal-air type, as well as the battery specially designed for implementing this method.

BACKGROUND

Metal-air batteries use a negative electrode based on a metal such as zinc, iron or lithium, coupled to an air electrode. The electrolyte used most often is an alkaline aqueous electrolyte.

During discharging of such a battery, oxygen is reduced at the positive electrode and the metal is oxidized at the negative electrode:

Discharge at the negative electrode: $M \rightarrow M^{n+} + n\, e^-$

Discharge at the positive electrode: $O_2 + 2H_2O + 4e^- \rightarrow 4 OH^-$

When a metal-air battery has to be recharged electrically, the direction of the current is reversed. Oxygen is produced at the positive electrode and the metal is redeposited by reduction at the negative electrode:

Recharge at the negative electrode: $M^{n+} + n\, e^- \rightarrow M$

Recharge at the positive electrode: $4OH^- \rightarrow O_2 + 2H_2O + 4e^-$

Metal-air systems have the advantage of using a positive electrode of infinite capacity. Electrochemical generators of the metal-air type are therefore known for their high specific energies, which can reach several hundred Wh/kg. The oxygen consumed at the positive electrode does not need to be stored in the electrode but can be taken from the surrounding air. Air electrodes are also used in alkaline fuel cells, which are particularly advantageous compared with other systems owing to the high reaction kinetics at the level of the electrodes and owing to the absence of noble metals such as platinum.

Problems during the recharging of batteries of the metal-air type have yet to be solved. In particular, the air electrode, which is the positive electrode of the battery during discharging, is not designed to be used in the recharging direction.

An air electrode is a porous solid structure in contact with the liquid electrolyte. The interface between the air electrode and the liquid electrolyte is a so-called "triple-contact" interface, where the active solid material of the electrode, the gaseous oxidant, i.e. air, and the liquid electrolyte are present simultaneously. A description of the different types of air electrodes for zinc-air batteries is presented for example in the bibliographic article by V. Neburchilov et al., with the title "A review on air cathodes for zinc-air fuel cells", *Journal of Power Sources* 195 (2010) pp. 1271-1291.

The air electrode is usually composed of carbon particles with a large surface area such as Vulcan® XC72 marketed by Cabot. The surface area of the carbon can be increased by reaction with a gas, such as CO, prior to its integration in the air electrode. A porous electrode is then produced by agglomeration of the carbon particles using a fluorinated hydrophobic polymer such as FEP (fluorinated ethylene propylene) marketed by the company DuPont. Patent WO 2000/036677 describes such an electrode for a metal-air battery.

It is preferable to have a reaction surface area on the air electrode that is as large as possible, in order to have a current density relative to the geometric surface area of the electrode that is as high as possible. A large reaction surface area is also useful because the density of gaseous oxygen is low compared with a liquid. The large surface area of the electrode allows the reaction sites to be multiplied. Conversely, this large reaction surface area is no longer necessary for the reverse reaction of oxidation during recharging since the concentration of active material is much higher.

The use of an air electrode during charging to bring about an oxidation reaction and evolution of oxygen presents many drawbacks. The porous structure of the air electrode is fragile. It was observed by the inventors that this structure was destroyed mechanically by the evolution of gas when it was used to produce oxygen by oxidation of a liquid electrolyte. The hydraulic pressure generated within the electrode by the production of gas is sufficient to cause the bonds between the carbon particles constituting the air electrode to rupture.

It was also observed by the inventors that the catalyst added to the air electrode to improve the energy yield of the reaction of reduction of oxygen, such as manganese oxide or cobalt oxide, is not stable at the potential required for the reverse oxidation reaction. The corrosion of carbon in the presence of oxygen by oxidation of carbon is also accelerated at higher potentials.

Some use a more resistant oxygen reduction catalyst coupled to an oxygen evolution catalyst in a bifunctional electrode composed of two electrically coupled layers, as described in patent U.S. Pat. No. 5,306,579. However, this configuration produces electrodes that nevertheless have a short service life and a limited number of cycles.

The degradation of the air electrode, when it is used to recharge the metal-air battery, greatly reduces the battery's service life. This is one of the main reasons for the low level of commercial development of electrically rechargeable metal-air accumulators.

Faced with these problems, one of the means that has been adopted for protecting the air electrode against degradation consists of using a second positive electrode, which is used for the oxygen evolution reaction. The air electrode is then decoupled from the oxygen evolution electrode and only the latter is used during the charging phase. For example, patent U.S. Pat. No. 3,532,548 of Z. Starchurski describes a zinc-air battery with a second auxiliary electrode used for the charging phase. During the charging phase, the air electrode is therefore inactive. As far as the inventors know, it has never been suggested that this air electrode could be used for anything during the step of charging the battery.

Moreover, as with all batteries, it is important to monitor and control the voltage at the terminals of a battery of the metal-air type while it is being discharged and recharged. The voltage at the terminals of a battery is generally measured without difficulty directly between the negative terminal and the positive terminal of the battery. The voltage at the terminals of the battery represents the potential difference of the positive electrode and negative electrode.

In the case of conventional batteries, the voltage can be controlled by electronic control systems or a BMS (battery management system). These devices are well known to a person skilled in the art. The aim of a BMS is to monitor the state of the various elements of the battery, as well as to protect it from the degradation that could be caused by improper use, for example overvoltage or undervoltage. The BMS therefore also has the function of increasing the battery's service life.

It was found by the inventors that simply controlling the voltage at the terminals of batteries of the metal-air type could be insufficient for optimum protection of the battery against certain types of degradation occurring on the negative electrode side during electrical recharging of a metal-air battery.

For example, in a zinc-air battery, during recharging, the $Zn^2$ metal ions are reduced at the negative electrode and are deposited in their metallic form Zn once the potential at the level of this electrode is sufficiently negative. A uniform and homogeneous deposit of metal on the electrode is desired for ensuring good durability during the cycles of charging and discharging of this battery.

It was found that, under certain conditions, the metal was deposited in the form of foam with little adherence to the surface of the electrode, and this foam could then become detached from the electrode, causing a loss of active material and consequently a loss of specific capacity of the battery. In other cases, it was found that the metal could also be deposited in the form of dendrites. These dendrites can grow until they reach the positive electrode during charging, causing an internal short-circuit, preventing recharging.

It was observed by the inventors that controlling the potential of the negative electrode during charging to prevent it becoming too high makes it possible to limit the formation of zinc deposits in the form of foam or dendrites.

However, in the case of metal-air batteries, it is known that, during charging, the potential of the positive electrode increases much more quickly than the potential of the negative electrode. Because of this, the control of the voltage at the terminals of the battery is not sufficiently precise to provide control of the potential of the negative electrode.

Therefore there is at present a need for an accurate means of measuring and controlling the potential of the negative electrode of a battery of the metal-air type while it is being charged.

SUMMARY

One of the aims of the present invention is therefore to devise a method for charging and discharging a battery of the metal-air type during which precise control of the potential of the negative electrode is provided. A battery having a means capable of performing this function is also desired. However, it would be advantageous not to increase the weight of the battery, as this would have the effect of decreasing its specific capacity.

In view of these findings, the inventors had the idea of taking advantage, during the discharging phase, of the presence of the air electrode, which is then inactive.

A subject of the present invention is a method for storing and releasing electrical energy using a metal-air battery comprising:
  a negative terminal,
  a positive terminal,
  a negative electrode, connected to the negative terminal,
  a first positive air electrode, and
  a second positive oxygen evolution electrode,
comprising the following steps:
  (a) a discharging phase during which the first positive air electrode is connected to the positive terminal of the battery and the second positive oxygen evolution electrode is disconnected from the positive terminal of the battery;
  (b) a recharging phase during which the second positive oxygen evolution electrode is connected to the positive terminal of the battery and the first positive air electrode is disconnected from the positive terminal of the battery, and during which the potential of the negative electrode is measured relative to the first positive air electrode.

Moreover, another subject of the invention is the device specially designed for implementing this method, i.e. a metal-air battery comprising:
  a negative terminal,
  a positive terminal,
  a negative electrode, connected to the negative terminal,
  a first positive air electrode,
  a second positive oxygen evolution electrode,
  a switching means allowing either the first positive air electrode or the second positive oxygen evolution electrode to be connected to the positive terminal, and
  a means for measuring the potential of the negative electrode, said measurement being performed relative to the first positive air electrode.

BRIEF DESCRIPTION OF THE DRAWINGS

FIG. 1, appended to the present application, is a diagrammatic representation of an embodiment of a battery forming the subject of the present invention, in a recharging configuration.

DETAILED DESCRIPTION

In the present application, the terms "charging" and "recharging" are used as synonyms, and are interchangeable.

The method for storing and releasing electrical energy according to the invention is implemented with a battery of the metal-air type. This metal-air battery comprises, conventionally, a negative terminal and a positive terminal. These two terminals allow the battery to be connected in order to form a power circuit: either a charging circuit in which the battery is connected to a charging means which supplies energy to the battery or a discharging circuit in which the battery is connected to any device to which it supplies energy.

The terminals of the battery are connected, in the battery, to electrodes.

The metal-air battery according to the invention comprises at least three electrodes:
  a negative electrode,
  a first positive air electrode, and
  a second positive oxygen evolution electrode.

The negative electrode is connected permanently, i.e. during charging and during discharging, to the negative terminal of the battery. The negative electrode can in principle be any metal electrode commonly used in a metal-air cell. It can for example be an iron electrode, a lithium electrode or a zinc electrode, preferably a lithium electrode ($Li/Li^+$) or a zinc electrode ($Zn/Zn^{2+}$).

The first positive electrode of the battery according to the invention is an air electrode. This type of electrode has been described in general above. Any type of air electrode can be used in the battery according to the present invention. In particular, the first positive air electrode of the battery can be an electrode obtained by agglomeration of a carbon powder constituted by carbon particles with a large specific surface area, as described in patent application WO 2000/036677. The air electrode, based on carbon particles, can further contain at least one oxygen reduction catalyst. This oxygen reduction catalyst is preferably selected from the group constituted by manganese oxide and cobalt oxide.

The second positive electrode of the battery according to the invention is an oxygen evolution electrode. Any type of electrode performing this function known to a person skilled in the art can be used in the battery according to the present invention. The second positive oxygen evolution electrode can for example be a metal electrode that is stable in the electrolyte of the battery, such as an electrode made of silver, of nickel or of stainless steel.

The method for storing and releasing electrical energy according to the invention comprises at least one discharging phase and one recharging phase.

During the discharging phase (a), the first positive air electrode is connected to the positive terminal of the battery and the second positive oxygen evolution electrode is disconnected from the positive terminal of the battery. The first positive air electrode is intended to be used as the working electrode during discharging of the battery, i.e. as the active positive electrode on which the electrochemical reaction occurring during discharging of the battery takes place.

During the recharging phase (b), the second positive oxygen evolution electrode is connected to the positive terminal of the battery and the first positive air electrode is disconnected from the positive terminal of the battery. The second positive oxygen evolution electrode is intended to be used as the working electrode during recharging of the battery, i.e. as the active positive electrode on which the electrochemical reaction occurring during recharging of the battery takes place.

That is why the battery specially designed for implementing this method also comprises a switching means allowing either the first positive air electrode or the second positive oxygen evolution electrode to be connected to the positive terminal.

According to an embodiment, switching of the connection of the positive terminal between the first and the second positive electrode can be operated manually. However, advantageously, the switching means can be connected to a switching control means. This means can be electronic, and it can advantageously be an element of an electronic control system or a BMS. The switching control means can operate the switching means so that it is the first positive air electrode that is connected to the positive terminal of the battery when the latter is being discharged and it is the second positive oxygen evolution electrode that is connected to the positive terminal of the battery when the latter is being recharged.

The switching control means can be adapted for measuring the voltage between the positive and negative terminals of the battery. This involves measuring the potential difference between the two working electrodes, namely between the negative electrode and the first positive air electrode during discharging and between the negative electrode and the second positive oxygen evolution electrode during recharging.

However, this measurement of the voltage at the terminals of the battery does not make it possible to provide precise control of the potential of the negative electrode during charging as the potential of the positive electrode then varies more quickly than the potential of the negative electrode. The potential difference measured between the positive terminal and the negative terminal of the battery therefore does not accurately reflect the potential of the negative terminal instantaneously.

So that measurement of the potential of the negative electrode does not depend on the potential of the second positive oxygen evolution electrode, the inventors propose that measurement is performed between the negative electrode and a reference electrode. A reference electrode is an electrode the potential of which is set during measurement. A working electrode, i.e. an electrode that is active during the electrochemical reaction, cannot be a reference electrode as its potential varies owing to the passage of the current.

That is why the recharging phase (b) of the method according to the present invention advantageously comprises a step consisting of measuring the potential of the negative electrode relative to the first positive air electrode. During recharging of the battery, the first air electrode is disconnected from the positive terminal of the battery. It is no longer the working electrode, and no current circulates through it. It can therefore advantageously be used as reference electrode for measuring the potential of the negative electrode during recharging of the battery.

The battery according to the invention, specially designed for implementing this method, advantageously comprises a means for measuring the potential of the negative electrode, said measurement being performed relative to the first positive air electrode.

Use of the positive air electrode as reference electrode for measuring the potential of the negative electrode during the discharging phase of the battery is particularly advantageous as it is not necessary to add to the device an electrode which would be dedicated to this function alone. The present invention therefore has the advantage of being simple and inexpensive as it does not require critical structural modifications to already existing batteries in order to be implemented. Moreover, as the metal-air batteries specially designed for implementing the method according to the invention do not comprise an additional electrode, their weight and their overall dimensions are unaffected.

Having a precise measurement of the value of the potential of the negative electrode is interesting for a person skilled in the art as it allows better management of the battery. For example, controlling the potential of the negative electrode during charging in batteries of the zinc-air type to prevent it being too high makes it possible to limit the formation of zinc deposits in the form of foam or dendrites.

In an advantageous embodiment, the absolute value of the potential of the negative electrode can be controlled during the recharging phase of the battery, so that it is not above a set value. The value of the potential of the negative electrode during recharging can preferably be controlled automatically by an electronic charge control means. The electronic control means can be an element of an electronic control system or a BMS. The charge control means can be adapted for continuously comparing, during recharging, the value of the potential of the negative electrode measured according to the invention against a set value, and for sending a regulation signal to the battery's charging means so that the absolute value of the measured potential remains below the set value.

In another advantageous embodiment, the absolute value of the potential of the negative electrode measured relative to the first positive air electrode can also be controlled during the discharging phase of the battery, so that it is not below a second set value. During the discharging phase, the first positive air electrode is connected to the positive terminal of the battery. Measuring the potential of the negative electrode relative to this first positive air electrode is therefore equivalent to measuring the voltage between the positive and negative terminals of the battery. Preferably, the discharging phase (a) of the battery is therefore stopped before the absolute value of the measured voltage is below the second fixed set value. The value of the potential of the negative electrode during recharging can be controlled automatically by an electronic discharge control means. This means can be combined with the electronic charge control means, and it can be an element of an electronic control system or a BMS. The discharge control means can be adapted for continuously comparing, during discharging, the value of the potential of the negative electrode measured according to the invention against the second set value, and for stopping the discharge of the battery if the absolute value of the measured potential falls below the set value.

So as to be able to implement these preferred embodiments, the metal-air battery according to the invention can comprise a charge control means adapted for keeping the absolute value of the voltage measured between the negative electrode and the first positive air electrode below a set value, during charging of the battery. Alternatively, or in addition, the metal-air battery according to the invention can comprise a discharge control means adapted for keeping the absolute value of the voltage measured between the negative electrode and the first positive air electrode above a second set value, during discharging of the battery. The charge control means and the discharge control means can optionally be one and the same means, performing both of these functions.

A battery according to the invention can further comprise an electronic battery control system, also called a BMS. The charge control means and/or discharge control means can form part of said electronic control system.

The invention will now be described in more detail with reference to the appended FIG. 1, showing diagrammatically an embodiment of a battery forming the subject of the present invention, in a recharging configuration.

The battery 1 comprises a negative terminal 2, a positive terminal 3, a negative electrode 4, connected to the negative terminal 2, a first positive air electrode 5 and a second positive oxygen evolution electrode 6. In the configuration shown in FIG. 1, which is a configuration that the battery can assume during a charging phase, it is the second positive oxygen evolution electrode 6 that is connected to the positive terminal 3 of the cell. However, the battery 1 also comprises a switching means 7 that makes it possible to disconnect the second positive oxygen evolution electrode 6 from the positive terminal 3 in order to connect the first positive air electrode 5 to it during the discharging phases. As the battery 1 is shown in the charging phase, a charging means 11 was shown in FIG. 1, connected to the negative 2 and positive 3 terminals of the battery. However, it does not form part of the battery 1.

The battery 1 further comprises a means for measuring the potential of the negative electrode 8. This potential is measured by measuring the voltage V between the negative electrode 4 and the first positive air electrode 5. During the recharging phase of the battery shown, the first positive air electrode 5 performs the role of a reference electrode as it is not connected to the positive terminal 3 of the battery.

The battery 1 further comprises a charge control means 9. This charge control means 9 continuously compares, during recharging, the value V measured by the measuring means 8 against a set value Vc, and the charge control means 9 sends a regulation signal 10 to the battery's charging means 11 so that the absolute value of the measured potential remains below the set value.

The invention claimed is:

1. A method for storing and releasing electrical energy using a metal-air battery comprising:
   a negative terminal,
   a positive terminal,
   a negative electrode, connected to the negative terminal,
   a positive air electrode, and
   a positive oxygen evolution electrode,
the method comprising the following steps:
   (a) a discharging phase during which the positive air electrode is connected to the positive terminal of the battery and the positive oxygen evolution electrode is disconnected from the positive terminal of the battery;
   (b) a recharging phase during which the positive oxygen evolution electrode is connected to the positive terminal of the battery and the positive air electrode is disconnected from the positive terminal of the battery, and during which the potential of the negative electrode is measured relative to the positive air electrode used as a reference electrode;
   wherein the absolute value of the potential of the negative electrode measured relative to the air electrode is controlled during the recharging phase of the metal-air battery, so that it is not above a set value determined in order to limit the formation of zinc deposits in the form of foam or dendrites on the negative electrode.

2. The method of claim 1, wherein the value of the potential of the negative electrode during recharging is controlled automatically by an electronic charge controller.

3. The method of claim 1, wherein, during the discharging phase, the absolute value of the potential of the negative electrode measured relative to the positive air electrode connected to the positive terminal of the battery is controlled so that it is not below a set value.

4. The method of claim 3, wherein the value of the potential of the negative electrode during discharging is controlled automatically by an electronic discharge controller.

5. A metal-air battery comprising:
   a negative terminal,
   a positive terminal,
   a negative electrode, connected to the negative terminal,
   a positive air electrode,
   a positive oxygen evolution electrode,
   a switch allowing either the positive air electrode or the positive oxygen evolution electrode to be connected to the positive terminal,
   a potential measurer for measuring the potential of the negative electrode, adapted for measuring the potential of the negative electrode during recharging of the battery, said measurement being performed relative to the positive air electrode used as a reference electrode, and
   a charge controller adapted for keeping the absolute value of the potential measured between the negative electrode and the positive air electrode below a set value during charging of the battery, in order to limit the formation of metal deposits in the form of foam or dendrites on the negative electrode.

6. The battery of claim 5, wherein it further comprises a discharge controller adapted for keeping the absolute value of the voltage measured between the negative electrode and the positive air electrode above a second set value, during discharging of the battery.

7. The battery of claim 5, wherein the battery further comprises an electronic battery control system, and said charge controller and/or discharge controller form part of the electronic control system.

* * * * *